(12) United States Patent
Jusionis

(10) Patent No.: US 9,102,002 B1
(45) Date of Patent: Aug. 11, 2015

(54) INTEGRATED AUTOMATIC VOLTAGE CONTROL (AVC) AND OSCILLATION CONTROL ASSEMBLY FOR ORBITAL WELDING APPLICATIONS

(76) Inventor: Vytautas John Jusionis, Westminster, CA (US)

( * ) Notice: Subject to any disclaimer, the term of this patent is extended or adjusted under 35 U.S.C. 154(b) by 1702 days.

(21) Appl. No.: 11/516,107

(22) Filed: Sep. 5, 2006

Related U.S. Application Data

(60) Provisional application No. 60/713,641, filed on Sep. 2, 2005.

(51) Int. Cl.
*B23K 9/10* (2006.01)
*B23K 9/28* (2006.01)

(52) U.S. Cl.
CPC ........................................ *B23K 9/28* (2013.01)

(58) Field of Classification Search
USPC ......... 219/125.11, 124.32, 60, 60 A, 60 R, 61
See application file for complete search history.

(56) References Cited

U.S. PATENT DOCUMENTS 4,538,046 A * 8/1985 Kazlauskas ................. 219/125.1
5,910,258 A * 6/1999 Kazirskis et al. ........... 219/60 R

* cited by examiner

*Primary Examiner* — Dana Ross
*Assistant Examiner* — Ayub Maye
(74) *Attorney, Agent, or Firm* — Christie, Parker & Hale, LLP

(57) ABSTRACT

A weldhead assembly is disclosed. The weldhead assembly comprises a welding torch, an AVC subassembly mounted on an oscillation base adapted for movement back and forth across a weld joint, the AVC subassembly adapted for movement of the weldhead closer to and farther from a weld joint, and a motor adapted for driving the movement of the AVC subassembly, the motor mounted on the oscillation base.

20 Claims, 4 Drawing Sheets

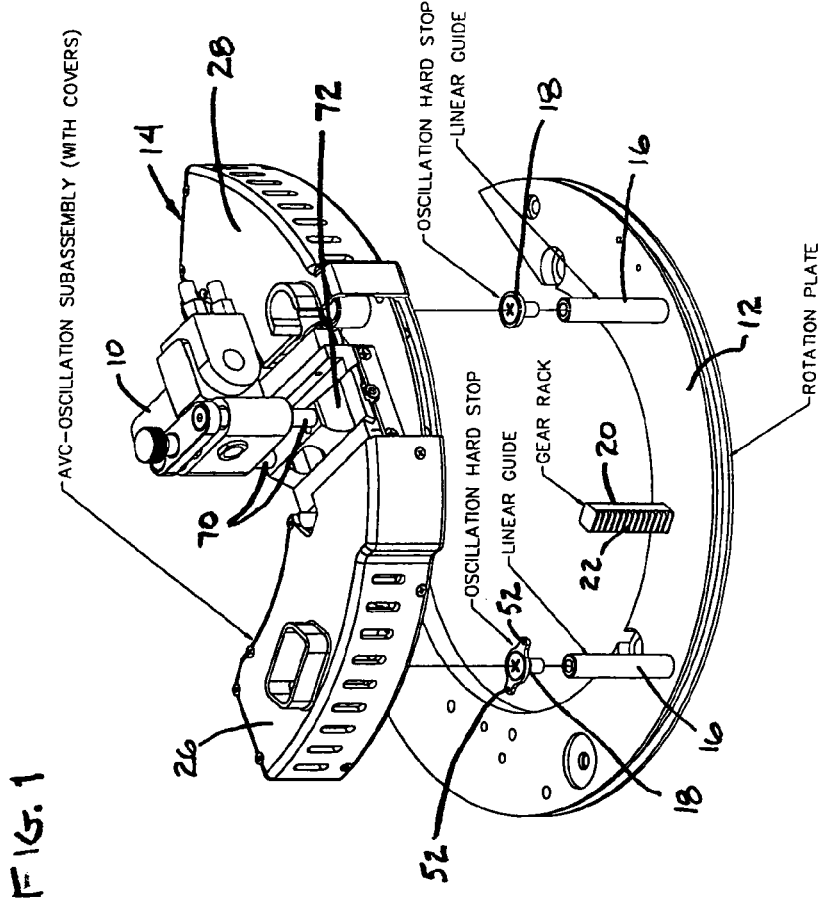
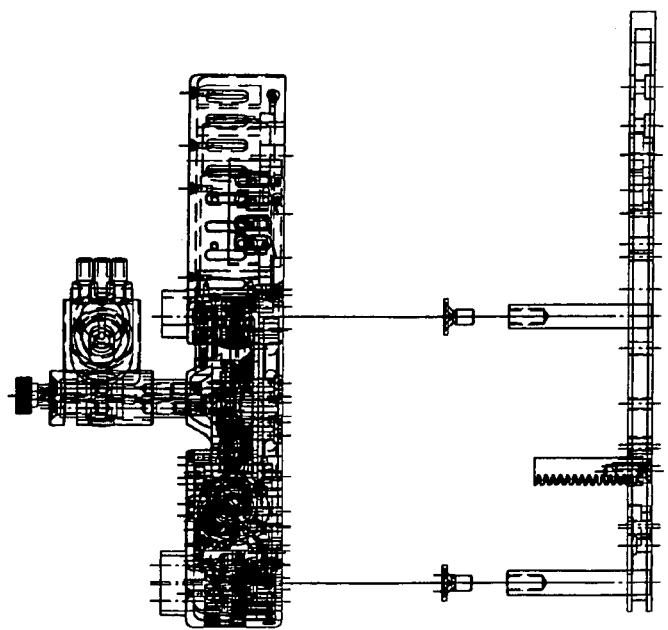
FIG. 1

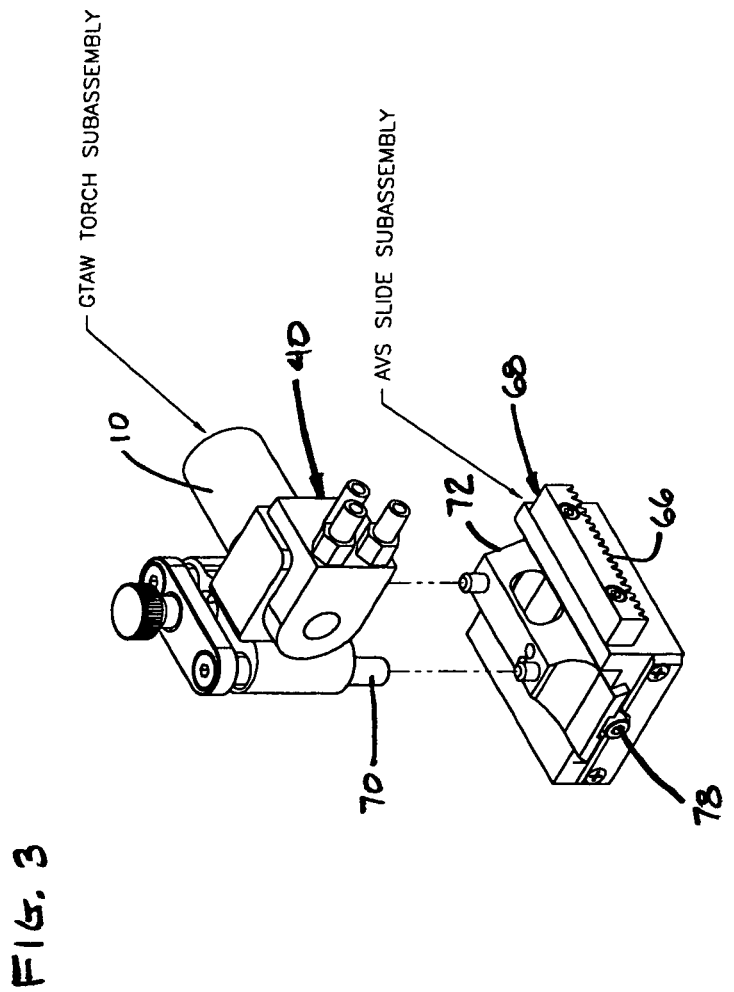
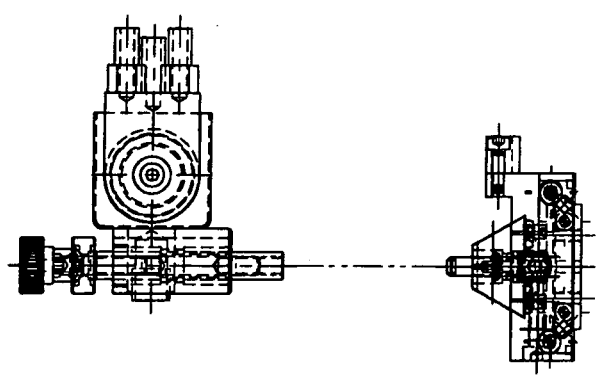
FIG. 3

INTEGRATED AUTOMATIC VOLTAGE CONTROL (AVC) AND OSCILLATION CONTROL ASSEMBLY FOR ORBITAL WELDING APPLICATIONS

CROSS-REFERENCE TO RELATED APPLICATION

This application claims the benefit of U.S. Provisional Application No. 60/713,641 filed on Sep. 2, 2005

BACKGROUND OF INVENTION

Orbital weldheads for use in gas tungsten arc welding (GTAW) can provide flexibility and accuracy in welding tubular joints for a variety of applications by using a simple single pass orbital motion of the weld torch around the weld joint for thin walled tubes. However, to perform GTAW of thickwalled tubes and pipes utilizing automatic orbital welding techniques, two orthogonally related motions of the weld torch must be simultaneously controlled by means of an integrated electro-mechanical system. The one motion is directed normal to, i.e., closer to or farther from, the weld part surface along the tungsten electrode centerline, commonly referred to as automatic voltage control or AVC, and the other motion is directed orthogonal to this in the direction of the centerline axis of the weld part, i.e., back and forth along the length of the pipe, commonly referred to as oscillation. Performing these functions in a confined area requires the design of an integrated unit that is both miniature but rugged and one that is properly designed to function in a closed-loop servo manner with maximization of the servo-control response to the AVC primarily and to the oscillation secondarily. In order to accomplish this the mass of the AVC mechanism must be minimized to reduce lagging inertial effects and the drive train smoothness maximized to promote unhindered motion.

To date, integrated units have emphasized, instead, the reverse of the above resulting in the mediocre performance of the AVC control that requires quick response. This is because it is much easier to mechanize the integrated unit with a motorized motion directly on the GTAW torch cross-seam adjustment, thus becoming the motorized oscillation, and then a motorized motion of the resulting mechanism on the AVC. This then results in a large AVC-controlled mass which includes the oscillation motor together with its accompanying slides and structure. In an exemplary embodiment, the present invention minimizes the mass to be controlled by the AVC first and then includes this mass into the oscillation motion that does not have to be as mechanically responsive.

SUMMARY OF THE INVENTION

In one embodiment, the present invention provides a weldhead assembly. The weldhead assembly comprises a support plate adapted to be positioned relative to a part to be welded, an oscillation subassembly movably mounted on the support plate and adapted to be moved relative to the support plate for movement back and forth across a weld joint (oscillation movement), an oscillation motor adapted for driving the movement of the oscillation subassembly, mounted on the oscillation subassembly, an AVC subassembly slidably mounted on the oscillation subassembly adapted for supporting the AVC subassembly and for movement of a weld torch closer to and farther from (AVC movement) a weld joint, and an AVC motor adapted for driving the movement of the AVC subassembly, mounted on the oscillation subassembly. Thus, the motors driving oscillation movement and AVC movement are both mounted on the oscillation subassembly to help keep the mass of the movement part of the AVC subassembly down. In another embodiment, the AVC subassembly is also configured so as to minimize its mass.

In further embodiments, the oscillation subassembly is movably mounted on the support plate by a pair of linear guides and the movement of the oscillation subassembly may be controlled through use of a gear rack. The linear guides may each be received in a linear bearing, which may be adjustable. The weldhead assembly may, in a particular embodiment, also comprise an oscillation position feedback assembly associated with the oscillation motor and adapted to monitor the relative position of the oscillation subassembly and control the oscillation of the weldhead. The AVC subassembly may also be slidably received in a dovetail-shaped recess mounted on the oscillation subassembly.

BRIEF DESCRIPTION OF THE DRAWINGS

The details of various embodiments of the present invention will be more clearly understood with reference to the following drawings and detailed description.

FIG. 1 shows a disassembled perspective view of a weldhead mounting assembly according to one embodiment of the present invention.

FIG. 3 shows a disassembled perspective view of a torch subassembly and an AVC slide subassembly according to one embodiment of the present invention.

DETAILED DESCRIPTION

Figure 2:
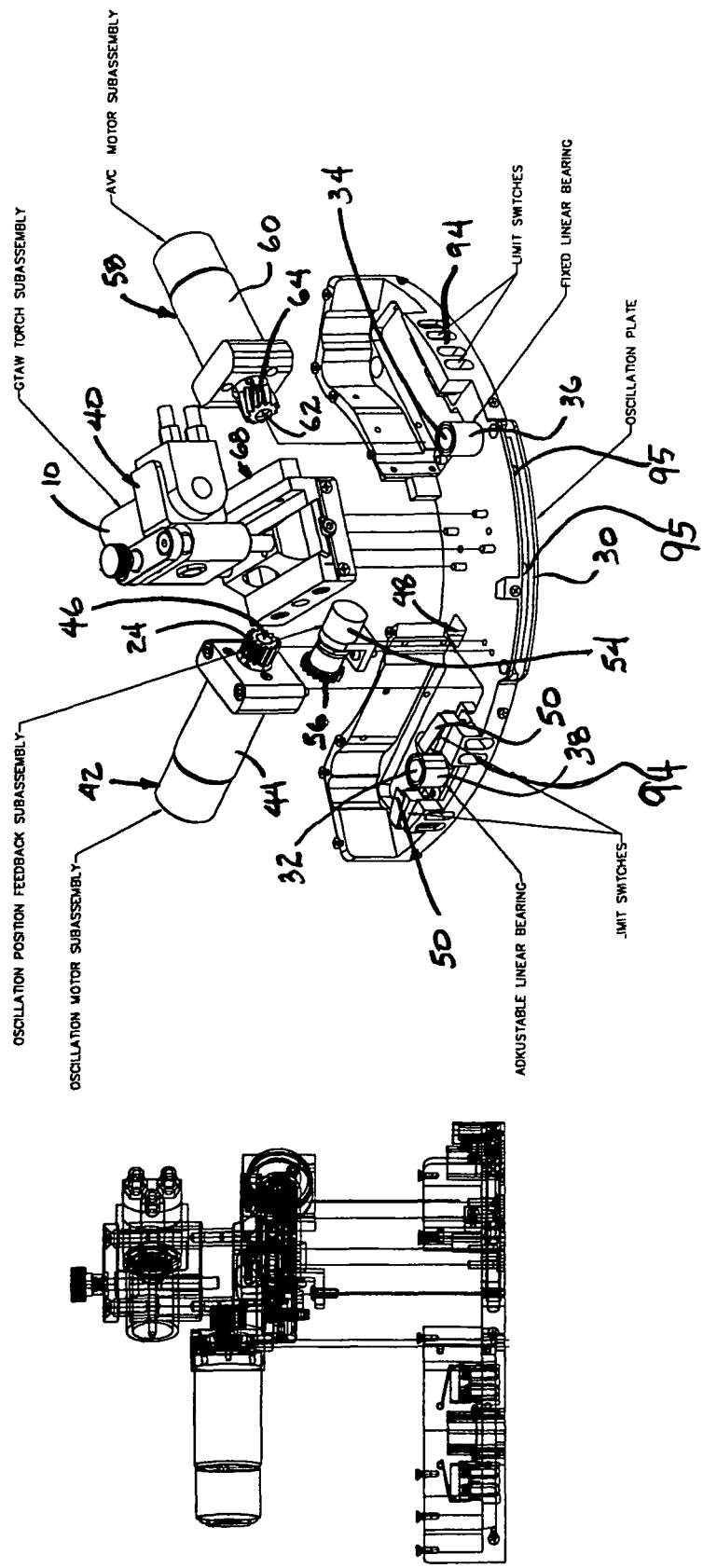
FIG. 2 shows a disassembled perspective view of an oscillation subassembly according to one embodiment of the present invention.

The attached FIGS. 1-4 depict a presently preferred embodiment of the present invention in the context of an open arc weldhead. In such a weldhead, a GTAW torch 10 is mounted on a rotation plate 12 (See. FIG. 1), along with a wire feed mechanism if applicable. The rotation plate then rotates or moves with respect to a weld part to be welded. By way of example, the rotation plate would rotate around the seam between two pipes held end to end so that the torch could be used to weld the two pipes together. It should be understood that the present invention, while applicable in the presently described context, is also expected to have utility in any orbital welding applications requiring two additional relative motions.

With reference to FIG. 1, the AVC subassembly that includes the GTAW torch is incorporated in an oscillation subassembly 14, which is movably mounted on rotation plate 12. As shown in FIG. 1, the oscillation subassembly is able to move up and down relative to the rotation plate. Such up and down motion would move the torch back and forth along the length of a weld part, an oscillation motion. In a welding operation, the back and forth motion of the torch is performed relatively slowly.

The up and down movement of oscillation subassembly 14 occurs along a pair of cylindrical linear guides 16 mounted on and extending up from the surface of the rotation plate. Two guides are preferably used to stabilize the up and down motion. Hard stops 18 are attached to the top ends of the linear guides to limit upward motion and prevent the oscillation subassembly from separating from the rotation plate. The up and down motion of the oscillation subassembly is controlled through use of a gear rack 20 mounted on and extending up from the surface of the rotation plate.

The gear rack has teeth 22 along one side that are adapted to interact with a gear 24 (see FIG. 2) mounted on the oscillation subassembly. The gear rack is positioned on the rotation plate so that teeth 22 interact with gear 24 at a point roughly half way on a line drawn between the central, longitudinal axes of linear guides 16. By so positioning the gear rack, any canting of the oscillation subassembly as it is driven up or down by gear 24 is reduced. As shown in FIG. 1, the oscillation subassembly is fitted with two protective covers 26 and 28, one on either side of the torch. FIG. 2 shows an exploded view of the primary components of the oscillation subassembly with the covers removed. The components of the oscillation subassembly are supported on an arcuate oscillation plate 30. Plate 30 has two circular openings 32 and 34 therein positioned so that linear guides 16 can extend up through the openings. Mounted on plate 30 and positioned above opening 34 is a fixed linear bearing 36. This bearing is fixed in place and adapted to receive one of the linear guides such that it can slide up and down therethrough with low friction.

Also mounted on plate 30 but positioned above opening 32 is an adjustable linear bearing 38. Bearing 38 is adapted to receive the other of the linear guides such that it can slide up and down therethrough with low friction. The position and orientation of bearing 38 is adjustable so that it can be adjusted during installation until the oscillation plate moves smoothly up and down on the linear guides. Bearing 38 is adjusted by slightly loosening the four screws that secure the base of bearing 38 to the plate 30 and allowing the bearing 38 to center itself over the linear guide 16. This is then followed by the securing of the bearing 38 in place with the four screws. In addition to providing a near perfect line up of the bearings 38 to the guides 16, this adjustment feature also reduces greatly the tolerance level needed in manufacturing location of the position of the guides 16.

Torch 10 is incorporated in the AVC subassembly 40 that is mounted in the center portion of the oscillation plate. To one side of the AVC subassembly, an oscillation motor subassembly 42 is fixedly mounted on the oscillation plate. The oscillation motor subassembly comprises a motor 44 and an output shaft 46. Gear 24 is mounted on output shaft 46. Motor subassembly 42 is positioned so that gear 24 is aligned with a generally square-shaped opening 48 in the oscillation plate. Gear rack 20 extend upwardly through this square-shaped opening to interact with gear 24. Thus, operation of motor 42 turns gear 24 and thereby raises or lowers the oscillation subassembly on the linear guides relative to rotation plate 12.

Mounted on the oscillation plate on either side of adjustable linear bearing 38 is a pair of limit switches 50. The limit switches are positioned so that they would be triggered by contacts 52 extending outward from either side of one of the hard stops 18 (see FIG. 1). Thus, should the oscillation subassembly be moved to its maximum height above the rotation plate, its movement would be stopped by the hard stops and the limit switches would turn motor 44 off so that it would not burn out by continuing to try to move subassembly 14 against the hard stops.

Also mounted on oscillation plate 30 is an oscillation position feedback subassembly 54. Subassembly 54 is positioned on the oscillation plate so that a gear 56 on the subassembly interacts with gear 24 on the oscillation motor subassembly. Thus, subassembly 54 is able to monitor the movement of gear 24 and, from knowledge of a fixed position in the travel of the oscillation subassembly, can thereby monitor the relative position of the oscillation subassembly. As AVC subassembly 10 has a fixed height above the oscillation plate, the up and down (oscillation) position of the torch can be monitored by subassembly 54. This information can be used in a control system including motor 44 to control the oscillation of the torch.

An AVC motor subassembly 58 is fixedly mounted on the oscillation plate on a side of the torch subassembly opposite the oscillation motor subassembly. Subassembly 58 is comprised of a motor 60 having an output shaft 62. Gear 64 is mounted on the output shaft. The AVC motor subassembly is positioned on the oscillation plate so that gear 64, a helical gear, is able to interact at a angle off normal to accommodate the circular configurational constraints of the plate 12, with downwardly facing teeth of the spur gear rack 66 on an AVC slide subassembly 68 (See FIG. 3). Thus, operation of motor 60 to turn gear 64 allows for the controlled in and out movement of AVC slide subassembly 68.

The GTAW torch subassembly 40 is mounted through a pair of pedestals 70 to an adjustable support 72. The torch subassembly is configured so as to minimize the mass of the subassembly while still retaining stability. Adjustable support 72 is slidably received in a dovetailed recess 74 in the top surface of the AVC slide subassembly. A positioning screw 76 having a hexagon socket head cap 78 is received in a central recess 80 in the floor of dovetailed recess 74 (see FIG. 4) by going through the front clearance hole to the recess 80, threading through the lead nut 89 that is attached to the adjustable support 72. The positioning screw 76 is secured by an e-clip fitted in a groove on the positioning screw 76 close to its socket head cap 78 on the inside wall of the recess cavity 80 whilst the socket head cap is on the outside wall of the recess cavity 80. Two thrust washers are inserted during the assembly process, one between the socket cap 78 and the outside wall of the recess 78 and one between the inside wall of the recess cavity 78 and the e-clip on the positioning screw 76. Turning the positioning screw moves the lead nut 89 and then the in and out position of support 72 and therefore torch 10 can be adjusted and set to a particular desired position. Once adjusted, the position of support 72 is fixed relative to the AVC slide subassembly. Accidental motion is prevented by preloading the dovetail slide 74.

Figure 4:
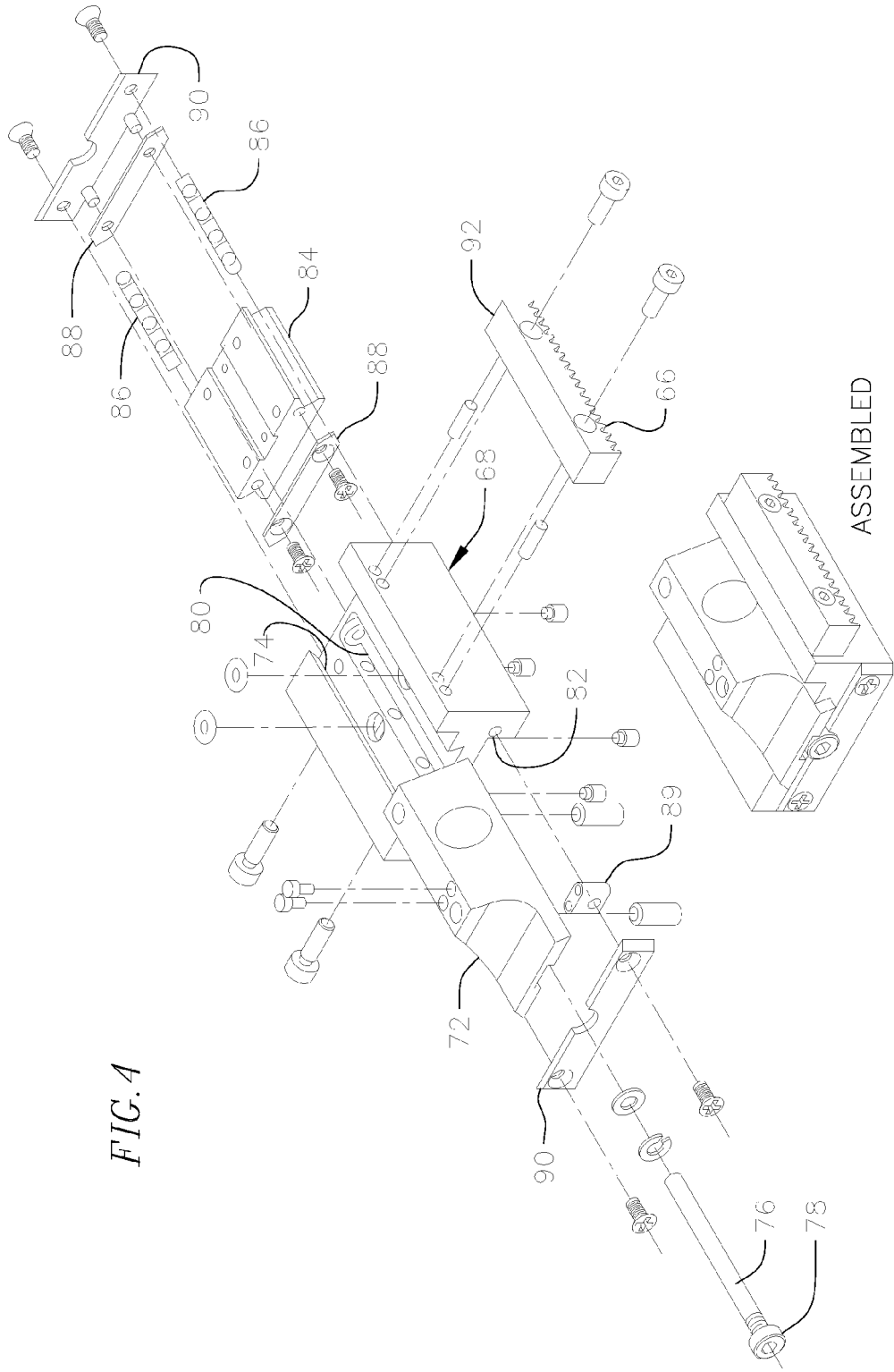
FIG. 4 shows a disassembled perspective view of an AVC slide subassembly according to one embodiment of the present invention.

As shown in FIG. 4, AVC slide subassembly 68 has a dovetail-shaped recess 82 in its lower surface. An anvil-shaped mount 84 that is fixedly attached to oscillation plate 30 (see FIG. 2) is received within the recess 82. Two lines of roller bearings 86 are captured between the outer side surfaces of anvil-shaped mount 84 and the inner side walls of dovetail-shaped recess 82. In each line of bearings, the bearings are alternately arranged at 90° to one another. A pair of end plates 88 attached to either end of mount 84 to keep any lubricant and the roller bearings in place along the side wall of mount 84. The side edges of end plates 88 are shaped so that recess 82 is free to slide in and out past the end plates.

A pair of stop plates 90 are attached to either end of the AVC slide subassembly covering the opposite ends of dovetail-shaped recess 82. These stop plates limit the extent of travel in both directions of the AVC slide subassembly on mount 84. A gear rack 92, having downwardly facing teeth 66 thereon, is attached to one side of the AVC slide subassembly. Mount 84 and the AVC slide subassembly slidably mounted thereon are positioned and configured so that teeth 66 will interact with gear 64 on the AVC motor subassembly. Thus, operation of motor 60 can be used to control the position of the AVC slide subassembly and, therefore, the in and out positioning of the torch mounted thereon. Moreover, because motor 60 needs only to move the AVC slide subassembly and the torch subassembly, it can provide fast movement and rapid response.

Limit switches 94 are also mounted on oscillation plate 30. These limit switches act to turn off the motor 60 of the AVC motor subassembly when the AVC slide subassembly has been moved to the limits of its travel. This prevents the burn out of motor 60.

To prevent damage to the motors in over-travel conditions against hard stops and to provide a means of calibrating the position of the oscillation mechanism, a set of limit switches are used. Limit switches 94 are used to with the oscillation motor 44. One pair of switches are used to limit the over travel at the extreme ends of travel by wiring them in series with one of the oscillation motor 44 leads. The switches are wired in the normally closed position and open when the limit is reached. The limit switches are wired across the normally closed pole points with diodes to allow reverse motion off the hard stop. Another set of limit switches 94 are used as calibration points for the oscillation motor, also at the extreme ends of travel. The limit switch 94 trip points are adjusted by set screws and such that the limit switches 94 for calibration trip before the limit switches 94 for over-travel. The same manner of over-travel protection is also incorporated into the AVC motor, however it does not have limit switches for calibration due to the feed back coming from the torch arc voltage itself. The switches are also set at the extreme ends of travel inside two holes 95 in the plate 12 parallel to the motion of the AVC mechanism 68, and made to trip before the AVC 68 hits hard stops. The same diode wiring is applied. However, these are magnetic reed switches that are activated through permanent magnets because of tight position and space constraints. The relative motion of the magnets embedded in the AVC mechanism 68 to the magnetic reed switches causes them to open or close thus allowing current to flow or stop to the AVC motor 60.

In order to provide functionality using magnetic reed switches the logic of the switch action had to be reversed. This is because the reed switches in an SPST configuration are always normally open. In order to get a normally closed function, a SPDT configuration must be chosen. However, in this application this is not practical because SPDT switches are larger in diameter making them too large in this application and because of their topography they are more vulnerable to damage. What has been done is to reverse the logic by placing a magnet close to the magnetic reed switch 95 embedded in the plate 12. This activates the switch thus closing it allowing for current to flow through the AVC motor 60 in normal operation. A second magnet is placed in the AVC mechanism 68 which upon sliding past the reed switch 95 and its associated magnet cancels the magnetic field and causes the switch to open, thus, turning off the current to the AVC motor 60 when the over-travel is reached. The same setup is provided for the second over-travel limit switch at the other end of the AVC travel located in the second hole 95.

Motors are 24VDC permanent magnet gear head made by Faulhaber of Switzerland.

A detailed description of various embodiments of the present invention has been provided above. Those skilled in the art will recognize that modifications and substitutions to the embodiments disclosed herein may be made for particular applications of the invention without departing from the spirit of the present invention. Such modifications and substitutions are within the scope and intent of the invention as defined in the following claims.

What is claimed is:

1. A weldhead assembly comprising:
   a support plate adapted to be positioned relative to a part to be welded;
   a welding torch;
   an oscillation subassembly movably mounted on the support plate by a plurality of linear guides and configured to be moved proximally to and distally from the support plate along the plurality of linear guides for movement of the welding torch back and forth across a weld joint during a welding operation;
   an oscillation motor adapted for driving the movement of the oscillation subassembly along the plurality of linear guides for movement of the welding torch back and forth across a weld joint during a welding operation, mounted on the oscillation subassembly;
   an automatic voltage control subassembly slidably mounted on the oscillation subassembly adapted for supporting the welding torch and for movement of the welding torch closer to and farther from a weld joint; and
   an automatic voltage control motor adapted for driving the movement of the automatic voltage control subassembly, mounted on the oscillation subassembly.

2. A weldhead assembly according to claim 1 wherein the plurality of linear guides are cylindrical.

3. A weldhead assembly according to claim 1 wherein the movement of the oscillation subassembly is controlled through use of a spur gear rack.

4. A weldhead assembly according to claim 1 wherein each of the plurality of linear guides is each received in a linear bearing.

5. A weldhead assembly according to claim 1 wherein the plurality of linear guides are each mounted at a first end to the support plate and have a stop at an opposite end to limit the range of movement of the oscillation subassembly relative to the support plate.

6. A weldhead assembly according to claim 1 also comprising an oscillation position feedback assembly associated with the oscillation motor and adapted to monitor the relative position of the oscillation subassembly and control the oscillation of the weldhead.

7. A weldhead assembly according to claim 1 wherein the automatic voltage control subassembly is slidably received in a dovetail-shaped recess mounted on the oscillation subassembly.

8. A weldhead assembly according to claim 1 wherein the automatic voltage control subassembly is configured so as to minimize its mass.

9. A weldhead assembly according to claim 3 wherein the spur gear rack is positioned about halfway between two of the plurality of linear guides.

10. A weldhead assembly according to claim 4 wherein at least one of the linear bearings is adjustable and at least one of the linear bearings is fixed.

11. A weldhead assembly according to claim 5 wherein at least four limit switches are associated with each of the plurality of linear guides and adapted to alert a control system of end-of-range for both end positions and provide an over-travel turn off of the oscillation motor when the oscillation subassembly has reached a limit of its range of movement at both end positions.

12. A weldhead assembly according to claim 11 wherein two of the limit switches at opposite ends of travel are adapted to be used for oscillation calibration.

13. A weldhead assembly according to claim 7 wherein a pair of stop plates are attached to either end of the dovetail-shaped recess to limit the range of movement of the automatic voltage control subassembly.

14. A weldhead assembly according to claim 13 wherein at least one limit switch is associated with each of the pair of stop plates and adapted to turn off the automatic voltage control motor when the automatic voltage control subassembly has reached a limit of its range of movement.

15. A weldhead assembly comprising:
a means for supporting the assembly relative to a part to be welded;
a means for welding;
an oscillation means movably mounted on the means for supporting the assembly by a plurality of linear guides for moving the oscillation means proximally to and distally from the means for supporting, and thereby for moving the means for welding back and forth across a weld joint along the plurality of linear guides during a welding operation;
a means mounted on the oscillation means for driving the movement of the oscillation means for moving the means for welding back and forth across a weld joint along the plurality of linear guides during a welding operation;
a means slidably mounted on the oscillation means for supporting the means for welding and for moving the means for welding closer to and farther from a weld joint; and
a means mounted on the oscillation means for driving the movement of the means slidably mounted on the oscillation means.

16. A weldhead assembly according to claim 15 also comprising means for monitoring the relative position of the oscillation means, and means for controlling the oscillation of the means for welding.

17. A weldhead assembly comprising:
a welding torch;
an automatic voltage control subassembly slidably mounted on an oscillation base configured for movement proximally to and distally from the oscillation base during a welding operation along a plurality of linear guides, the automatic voltage control subassembly adapted for movement of the welding torch closer to and farther from a weld joint; and
an automatic voltage control motor adapted for driving the movement of the automatic voltage control subassembly, mounted on the oscillation base.

18. A weldhead assembly according to claim 17 wherein the automatic voltage control subassembly is configured so as to minimize its moving mass.

19. A weldhead assembly according to claim 17 wherein the automatic voltage control motor has an output shaft with a drive gear that is helical.

20. A weldhead assembly according to claim 19 wherein a spur gear rack on the automatic voltage control subassembly mates with the helical drive gear of the automatic voltage control motor at a prescribed helical angle.

* * * * *